(12) United States Patent
Alon et al.

(10) Patent No.: US 10,275,031 B2
(45) Date of Patent: Apr. 30, 2019

(54) ENHANCED ACCESSIBILITY IN PORTABLE MULTIFUNCTION DEVICES

(71) Applicant: E2C Ltd., Yokneam (IL)

(72) Inventors: Amir Alon, Kiryat Ono (IL); Yaniv Tzanany, Rosh-Haayin (IL)

(73) Assignee: E2C LTD., Yokneam (IL)

( * ) Notice: Subject to any disclaimer, the term of this patent is extended or adjusted under 35 U.S.C. 154(b) by 0 days.

(21) Appl. No.: 15/328,965

(22) PCT Filed: Jul. 27, 2015

(86) PCT No.: PCT/IL2015/050770
§ 371 (c)(1),
(2) Date: Jan. 25, 2017

(87) PCT Pub. No.: WO2016/020913
PCT Pub. Date: Feb. 11, 2016

(65) Prior Publication Data
US 2017/0212594 A1 Jul. 27, 2017

Related U.S. Application Data

(60) Provisional application No. 62/034,347, filed on Aug. 7, 2014.

(51) Int. Cl.
G06F 3/0488 (2013.01)
G06F 3/01 (2006.01)
(52) U.S. Cl.
CPC ............ *G06F 3/016* (2013.01); *G06F 3/0488* (2013.01); *G06F 2203/014* (2013.01)

(58) Field of Classification Search
CPC .............................. G06F 3/016; G06F 3/0488
See application file for complete search history.

(56) References Cited

U.S. PATENT DOCUMENTS

| 6,323,846 | B1 | 11/2001 | Westerman et al. |
| 6,570,557 | B1 | 5/2003 | Westerman et al. |
| 6,677,932 | B1 | 1/2004 | Westerman |
| 7,614,008 | B2 | 11/2009 | Ording |
| 7,633,076 | B2 | 12/2009 | Huppi et al. |
| 7,653,883 | B2 | 1/2010 | Hotelling et al. |

(Continued)

FOREIGN PATENT DOCUMENTS

JP 2012118731 A 6/2012

OTHER PUBLICATIONS

"AccessibilityEvent: public final class AccessibilityEvent extends AccessibilityRecord implements Parcelable"; https://developer.android.com/reference/android/view/accessibility/AccessibilityEvent.html; Last accessed Jan. 25, 2017.

(Continued)

*Primary Examiner* — Andrea C Leggett
(74) *Attorney, Agent, or Firm* — The Roy Gross Law Firm, LLC; Roy Gross

(57) ABSTRACT

A method, an application launcher, an operating system and a portable multifunction device, in which a long touch of a touch-sensitive display causes the portable multifunction device to (a) briefly vibrate, thereby signaling to the user that the continuous touch has been recognized by the portable multifunction device, and (b) perform an action in a GUI of the portable multifunction device, based on a location of the long touch.

12 Claims, 3 Drawing Sheets

(56) References Cited

U.S. PATENT DOCUMENTS

| | | |
|---|---|---|
| 7,657,849 B2 | 2/2010 | Chaudhri et al. |
| 7,663,607 B2 | 2/2010 | Hotelling et al. |
| 7,844,914 B2 | 11/2010 | Andre et al. |
| 7,957,762 B2 | 6/2011 | Herz et al. |
| 8,006,002 B2 | 8/2011 | Kalayjian et al. |
| 8,239,784 B2 | 8/2012 | Hotelling et al. |
| 8,279,180 B2 | 10/2012 | Hotelling et al. |
| 8,381,135 B2 | 2/2013 | Hotelling et al. |
| 8,479,122 B2 | 7/2013 | Hotelling et al. |
| 9,348,458 B2 | 5/2016 | Hotelling et al. |
| 2002/0015024 A1 | 2/2002 | Westerman et al. |
| 2005/0190059 A1 | 9/2005 | Wehrenberg |
| 2006/0017692 A1 | 1/2006 | Wehrenberg et al. |
| 2006/0033724 A1 | 2/2006 | Chaudhri et al. |
| 2006/0197753 A1 | 9/2006 | Hotelling |
| 2011/0141052 A1 | 6/2011 | Bernstein et al. |
| 2011/0244844 A1 | 10/2011 | Aoike |
| 2012/0038572 A1 | 2/2012 | Kim et al. |
| 2012/0062564 A1 | 3/2012 | Miyashita et al. |
| 2012/0200510 A1 | 8/2012 | Pettey et al. |
| 2012/0306766 A1 | 12/2012 | Moore |
| 2013/0278526 A1 | 10/2013 | Zhu |
| 2015/0046876 A1* | 2/2015 | Goldenberg .......... G06F 3/0482 715/834 |

OTHER PUBLICATIONS

"MotionEvent public final class MotionEvent extends InputEvent implements Parcelable"; https://developer.android.com/reference/android/view/MotionEvent.html; Last accessed Jan. 25, 2017.

"View.OnLongClickListener public static interface View.OnLongClickListener"; https://developer.android.com/reference/android/view/View.OnLongClickListener.html; Last accessed Jan. 25, 2017.

"View.OnClickListener public static interface View.OnClickListener"; https://developer.android.com/reference/android/view/View.OnClickListener.html; Last accessed Jan. 25, 2017.

* cited by examiner

ENHANCED ACCESSIBILITY IN PORTABLE MULTIFUNCTION DEVICES

RELATED APPLICATIONS

This application is a National Phase of PCT Patent Application No. PCT/IL2015/050770 having International filing date of Jul. 27, 2015, which claims the benefit of priority of U.S. Provisional Patent Application No. 62/034,347 filed on Aug. 7, 2014. The contents of the above applications are all incorporated by reference as if fully set forth herein in their entirety.

FIELD OF THE INVENTION

The invention relates to the field of accessibility features of portable multifunction devices.

BACKGROUND

Portable multifunction devices, such as modern smart phones, tablet computers, etc., provide user interfaces with high resolutions and the ability to navigate amongst numerous items and applications. Commonly, these devices are equipped with touch-sensitive screens, which enable users to conveniently interact with the devices using even gentle finger touches, swipes and the like.

This trend toward touch-sensitive screens is viewed by many as a positive movement in favor of efficiency and productivity. However, to some individuals, this blessing is actually a curse. For example, elderly or sick people experiencing partial or complete sensory loss in their fingertips may find it very hard or even impossible to feel when their fingers actually touch the screen. Similarly, individuals with deprived or underdeveloped fine motor skills may encounter difficulties in finely controlling their fingers in the vicinity of the screen; for example, they may touch the screen when not intending to do so, or touch it at an unintended location. These phenomena often lead to great frustration among some individuals, who find themselves forced out of the touch screen trend and the great advantages such modern devices provide.

The foregoing examples of the related art and limitations related therewith are intended to be illustrative and not exclusive. Other limitations of the related art will become apparent to those of skill in the art upon a reading of the specification and a study of the figures.

SUMMARY

The following embodiments and aspects thereof are described and illustrated in conjunction with systems, tools and methods which are meant to be exemplary and illustrative, not limiting in scope.

There is provided, in accordance with an embodiment, a method for operating a portable multifunction device, the method comprising: automatically activating an application launcher immediately upon a loading of an operating system of the portable multifunction device, thereby exclusively controlling application launching in the portable multifunction device; using the application launcher, automatically running an accessible GUI (Graphical User Interface) application; in the accessible GUI application, listening for an invocation of a long click event by the operating system, wherein the long click event is caused by a user continuously touching a touch-sensitive display of the portable multifunction device for 250 milliseconds (ms) or more; and responsive to the long click event: (a) causing the portable multifunction device to vibrate for 300 ms or less, thereby signaling to the user that the continuous touch has been recognized by the portable multifunction device, and (b) performing an action in the accessible GUI application, based on a location of the continuous touch by the user.

There is further provided, in accordance with an embodiment, an application launcher for a portable multifunction device, the application launcher comprised in a non-transitory computer-readable storage medium having program code embodied therewith, the program code executable by at least one hardware processor of the portable multifunction device for: automatically activating an application launcher immediately upon a loading of an operating system of the portable multifunction device, thereby exclusively controlling application launching in the portable multifunction device; using the application launcher, automatically running an accessible GUI (Graphical User Interface) application; in the accessible GUI application, listening for an invocation of a long click event by the operating system, wherein the long click event is caused by a user continuously touching a touch-sensitive display of the portable multifunction device for 250 milliseconds (ms) or more; and responsive to the long click event: (a) causing the portable multifunction device to vibrate for 300 ms or less, thereby signaling to the user that the continuous touch has been recognized by the portable multifunction device, and (b) performing an action in the accessible GUI application, based on a location of the continuous touch by the user.

There is further provided, in accordance with an embodiment, a portable multifunction device comprising: a touch-sensitive display; a vibrator; at least one CPU (Central Processing Unit); and a non-transitory memory device having program code of an application launcher embodied therewith, the program code executable by said at least one CPU for: automatically activating the application launcher immediately upon a loading of an operating system of the portable multifunction device, thereby exclusively controlling application launching in the portable multifunction device, using the application launcher, automatically running an accessible GUI (Graphical User Interface) application, in the accessible GUI application, listening for an invocation of a long click event by the operating system, wherein the long click event is caused by a user continuously touching said touch-sensitive display for 250 milliseconds (ms) or more, and responsive to the long click event: (a) causing said vibrator to vibrate for 300 ms or less, thereby signaling to the user that the continuous touch has been recognized by the portable multifunction device, and (b) performing an action in the accessible GUI application, based on a location of the continuous touch by the user.

In some embodiments, the operating system is Android, and the long click event is provided by View.OnLongClickListener.

In some embodiments, the long click event is caused by the user continuously touching the touch-sensitive display of the portable multifunction device for 500 ms or more.

In some embodiments, the causing of the portable multifunction device or the vibrator to vibrate is for 150 ms or less.

There is further provided, in accordance with an embodiment, a method for operating a portable multifunction device, the method comprising: listening for an attempt of an operating system of the portable multifunction device to invoke a click event, wherein the attempt to invoke the click event is caused by a user touching a location on a touch-sensitive display of the portable multifunction device; temporarily blocking the invocation attempt of the click event; if, during a predefined period of initiating the temporary blocking, a finger up event is invoked by the operating system, permanently blocking the invocation of the click event, wherein the finger up event indicates that the user ceased to touch the touch-sensitive display; if, during the entirety of the predefined period, a finger up event has not been invoked by the operating system, then: (a) if the user is presently touching the same location on the touch-sensitive display: (i) causing the portable multifunction device to vibrate for 300 ms or less, thereby signaling to the user that the touch has been recognized by the portable multifunction device, and (ii) performing an action in a GUI of the operating system, based on the location of the touch, (b) if the user is presently touching a different location on the touch-sensitive display, permanently blocking the invocation attempt.

There is further provided, in accordance with an embodiment, an operating system for a portable multifunction device, the operating system comprised in a non-transitory computer-readable storage medium having program code embodied therewith, the program code executable by at least one hardware processor of the portable multifunction device for: listening for an attempt of an operating system of the portable multifunction device to invoke a click event, wherein the attempt to invoke the click event is caused by a user touching a location on a touch-sensitive display of the portable multifunction device; temporarily blocking the invocation attempt of the click event; if, during a predefined period of initiating the temporary blocking, a finger up event is invoked by the operating system, permanently blocking the invocation of the click event, wherein the finger up event indicates that the user ceased to touch the touch-sensitive display; if, during the entirety of the predefined period, a finger up event has not been invoked by the operating system, then: (a) if the user is presently touching the same location on the touch-sensitive display: (i) causing the portable multifunction device to vibrate for 300 ms or less, thereby signaling to the user that the touch has been recognized by the portable multifunction device, and (ii) performing an action in a GUI of the operating system, based on the location of the touch, (b) if the user is presently touching a different location on the touch-sensitive display, permanently blocking the invocation attempt.

There is further provided, in accordance with an embodiment, a portable multifunction device comprising: a touch-sensitive display; a vibrator; at least one CPU (Central Processing Unit); and a non-transitory memory device having program code of an operating system embodied therewith, the program code executable by said at least one CPU for: listening for an attempt of an operating system of the portable multifunction device to invoke a click event, wherein the attempt to invoke the click event is caused by a user touching a location on a touch-sensitive display of the portable multifunction device; temporarily blocking the invocation attempt of the click event; if, during a predefined period of initiating the temporary blocking, a finger up event is invoked by the operating system, permanently blocking the invocation of the click event, wherein the finger up event indicates that the user ceased to touch the touch-sensitive display; if, during the entirety of the predefined period, a finger up event has not been invoked by the operating system, then: (a) if the user is presently touching the same location on the touch-sensitive display: (i) causing the portable multifunction device to vibrate for 300 ms or less, thereby signaling to the user that the touch has been recognized by the portable multifunction device, and (ii) performing an action in a GUI of the operating system, based on the location of the touch, (b) if the user is presently touching a different location on the touch-sensitive display, permanently blocking the invocation attempt.

In some embodiments, the operating system is Android, and: (i) the click event is provided by View.OnClickListener, (ii) the finger up event is provided by view.MotionEvent, (iii) the method further comprises utilizing view.MotionEvent for determining if the user is presently touching the same location or a different location on the touch-sensitive display.

In some embodiments, the operating system is Android operating in accessibility mode, and: (i) the click event is provided by TYPE_VIEW_HOVER_ENTER, (ii) the finger up event is provided by TYPE_VIEW_HOVER_EXIT, (iii) the method further comprises utilizing view.MotionEvent for determining if the user is presently touching the same location or a different location on the touch-sensitive display.

In some embodiments, the predefined period is between 250 and 750 ms.

In some embodiments, the causing of the portable multifunction device to vibrate is for 150 ms or less.

In addition to the exemplary aspects and embodiments described above, further aspects and embodiments will become apparent by reference to the figures and by study of the following detailed description.

BRIEF DESCRIPTION OF THE FIGURES

Exemplary embodiments are illustrated in referenced figures. Dimensions of components and features shown in the figures are generally chosen for convenience and clarity of presentation and are not necessarily shown to scale. The figures are listed below.

DETAILED DESCRIPTION

Disclosed herein are a method, an application launcher, an operating system and a portable multifunction device, in which only a long touch (also referred to as a long click) of a touch-sensitive display of the portable multifunction device causes the portable multifunction device to perform an action in a GUI. A short touch (also referred to as a short click), on the other hand, is ignored, such that no action in the GUI occurs when a detected touch is too brief.

In some embodiments, the threshold separating a long touch from a short touch is a value between 250 and 750 milliseconds (ms). In further embodiments, that threshold is a value between 400 and 600 ms.

Advantageously, a portable multifunction device which responds only to long touches (during the entirety of its operation or at least when entered into a suitable mode) may be highly-usable by the elderly, young children, individuals suffering from sensory loss in their fingertips, and/or those whose fine motor skills prevent them from properly operating the device using short touches.

In some embodiments, a brief vibration of the portable multifunction device is used when a long touch is detected, to signal to the user that the touch has been recognized by the portable multifunction device. The vibration is, optionally, for a duration of up to 300 ms. Optionally, the vibration is for a duration of 150 ms or less. If a vibration is used, then the action in the GUI may only be executed after the vibration ceases. The vibration, advantageously, may assist a user who is unsure whether his or her touching of the touch-sensitive display is actually recognized. Such uncertainty is a common complaint of elderly people and those with sensory loss in their fingertips, who are trying to cope with touch-sensitive screens. However, in present embodiments, the vibration propagates through the user's finger, palm, and sometimes even further up the arm, and can be clearly sensed. The user then knows that he or she can cease the touching.

Present embodiments may be generally divided into three: those which utilize an application launcher and are described with reference to FIG. 1; those which are implemented at the operating system (OS) level of the portable multifunction device, and are described with reference to FIG. 2; and those which are implemented using an accessibility functionality of the portable multifunction device, and are also described with reference to FIG. 2. Namely, the OS-level implementation and the accessibility implementation may be closely similar.

Figure 1:
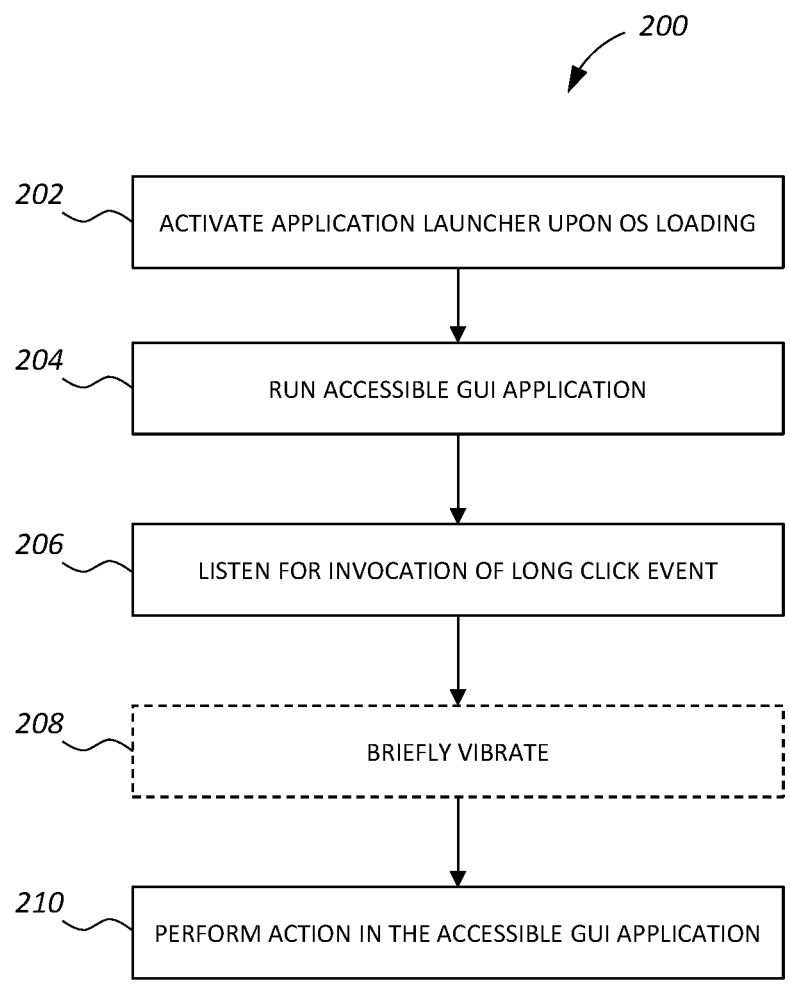
FIG. 1 shows a flow chart of a method for operating a portable multifunction device.

Reference is now made to FIG. 1, which shows a flow chart of a method 200 for operating a portable multifunction device. Method 200 may be executed by at least one CPU (Central Processing Unit) of the portable multifunction device. Program code which includes instructions for executing method 200 may be stored on a non-transient memory of the portable multifunction device. Optionally, the program code constitutes an application launcher. As known in the art, an application launcher is a computer program that helps a user of a portable multifunction device to locate and start other computer programs. The application launcher may provide a GUI (Graphical User Interface) which partially or fully replaces a default GUI of the OS of the portable multifunction device. In some embodiments, the OS is Android, which is a mobile OS based on the Linux kernel that is currently developed by Google, Inc., of Mountain View, Calif. In further embodiments, the OS is iOS, a mobile OS currently developed by Apple, Inc., of Cupertino, Calif. In yet other embodiments, the OS is Windows Phone, a mobile OS currently developed by Microsoft Corporation of Redmond, Wash. Those of skill in the art, however, will recognize that the present method may be run by a different mobile OS presently existing or introduced in the future.

In a step 202, an application launcher may be automatically activated immediately upon a loading of the OS of the portable multifunction device. Namely, the user, after switching on the device, does not have any opportunity to interact with the default GUI of the OS, and his or her first encounter is with the GUI of the application launcher. This allows the application launcher to exclusively control application launching in the portable multifunction device.

In a step 204, the application launcher, upon being activated, may automatically run an accessible GUI application. The accessible GUI application may be designed for use by the elderly, young children, those with impaired vision, etc. To this end, the accessible GUI application may be characterized by relatively large, clear texts and graphics. The accessible GUI application may include functionalities for initiating and receiving telephone calls, for using messaging services such as SMS (Short Messaging Services) or others, for using social networks, for capturing photos using a camera of the portable multifunction device, for viewing photos, and/or the like.

Since the accessible GUI application runs immediately after the application launcher is activated, and the application launcher is activated immediately upon the OS loading, the user may only be exposed, after switching on the portable multifunction device, to the accessible GUI application. Namely, the user may be preventing from using the portable multifunction device by the functionalities offered in its default GUI.

In a step 206, the accessible GUI application may listen for an invocation of a long click event by the operating system, wherein the long click event is caused by a user continuously touching a touch-sensitive display of the portable multifunction device for 250 ms or more, such as up to 750 ms. If any shorter click is detected, the accessible GUI application may ignore it and not perform any action, treating it as an accidental click.

In the Android OS, for example, the accessible GUI application my listen to the View.OnLongClickListener interface. See http://developer.android.com/reference/android/view/View.OnLongClickListener.html, last accessed Jul. 10, 2014.

In an optional step 208, responsive to the long click event which is detected during the listening of step 206, the portable multifunction device may be caused to briefly vibrate, by operating a vibrator of the portable multifunction device. The brief vibration may last 300 ms or less, and optionally 150 ms or less. During this period, the vibrator may vibrate at a frequency of between 4 Hz and 30 Hz. The brief vibration may signal to the user that the continuous touch has been recognized by the portable multifunction device.

In a step 210, an action in the accessible GUI application may be performed, based on a location of the continuous touch by the user. Namely, if the continuous touch was at a location on the touch-sensitive where a certain button, link or another control was displayed, then the action associated with that button, link or other control may be performed.

Figure 2:
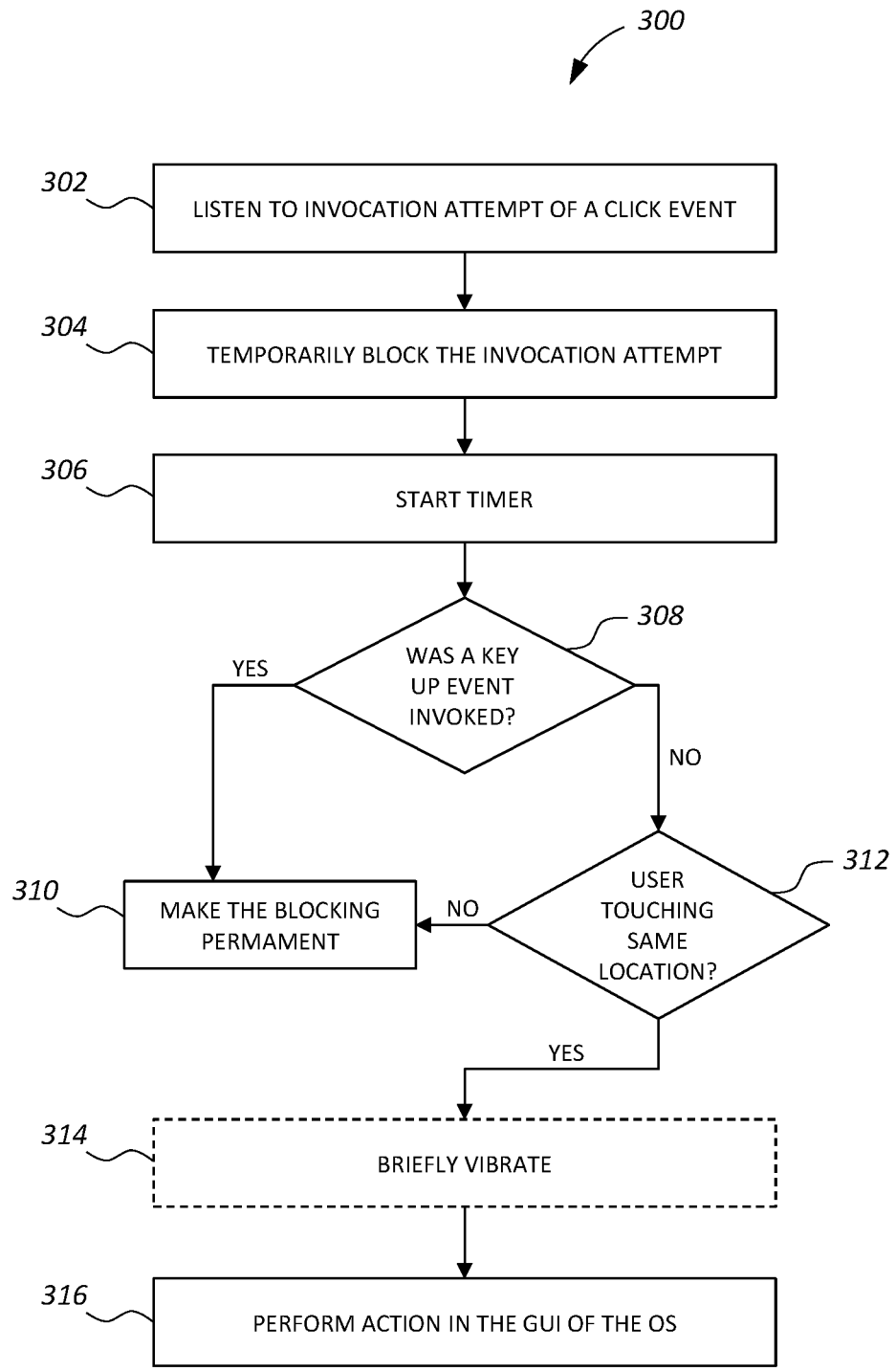
FIG. 2 shows a flow chart of another method for operating a portable multifunction device.

Reference is now made to FIG. 2, which shows a flow chart of a method 300 for operating a portable multifunction device. Method 300 may be executed by at least one CPU (Central Processing Unit) of the portable multifunction device. Program code which includes instructions for executing method 300 may be stored on a non-transient memory of the portable multifunction device. Optionally, the program code constitutes a mobile OS or a part thereof. In some embodiments, the OS is Android, which is a mobile OS based on the Linux kernel that is currently developed by Google, Inc., of Mountain View, Calif. In further embodiments, the OS is iOS, a mobile OS currently developed by Apple, Inc., of Cupertino, Calif. In yet other embodiments, the OS is Windows Phone, a mobile OS currently developed by Microsoft Corporation of Redmond, Wash. Those of skill in the art, however, will recognize that the present method may be utilized as part of a different mobile OS presently existing or introduced in the future.

A step 302 may include listening for an attempt of the OS of the portable multifunction device to invoke a click event. This attempt of the OS may be caused by a user touching a location on the touch-sensitive display of the portable multifunction device. In the Android OS, for example, the interface View.OnClickListener may be used for listening. See http://developer.android.com/reference/android/view/View.OnClickListener.html, last accessed Jul. 10, 2014. Alternatively, the Android OS may be operated in what is known as "accessibility mode", in which certain functionality is offered for the hearing impaired or those with impaired vision. In this mode, the TYPE_VIEW_HOVER- _ENTER event may be listened to, which is indicative of an initiation of a touch by a user. See http://developer.android.com/reference/android/view/accessibility/AccessibilityEvent.html, last accessed Jul. 10, 2014.

Since, when the OS tries to invoke the click event, it is not yet known how long the user will maintain his or her finger at the same location on the touch-sensitive display, a step 304 may include temporarily blocking the invocation attempt of the click event, until it can be determined whether this is a short click, a long click or a different gesture (e.g. a finger swipe across the touch-sensitive display).

Immediately upon initiating the temporary blocking, a timer may be started, in a step 306, to count down (or up) for a predefined period. In some embodiments, the predefined period is a value between 250 and 750 ms.

As the timer runs, it may be determined, in a decision step 308, whether the user has ceased to touch the touch-sensitive display. This may be referred to as a "finger up event". This step may be implemented, for example, using the view.MotionEvent class of Android OS. The ACTION_CANCEL and/or ACTION_UP constants of the view.MotionEvent class may be inspected, to determine whether the touch has been aborted or finished, respectively. See http://developer.android.com/reference/android/view/MotionEvent.html, last accessed Jul. 10, 2014.

If the Android OS is operated in accessibility mode, then the event TYPE_VIEW_HOVER_EXIT may be listened to, indicative of when a user ceases to touch the screen. See http://developer.android.com/reference/android/view/accessibility/AccessibilityEvent.html, last accessed Jul. 10, 2014.

If the user ceased to touch the touch-sensitive display during the run time of the timer, then the blocking of the invocation of the click event may become permanent, in a step 310. Namely, the click event may be discarded and not processed by the OS. Then, the listening of step 302 may be returned to, since the present click is too short to be used as a trigger for action.

If, on the other hand, the timer ends without the user ceasing to touch the touch-sensitive display, then method 300 may continue to a decision step 312. In this decision step 312, it may be determined whether the user is presently touching the same location on the touch-sensitive display as he or she did when the click event invocation attempt was made. Namely, decision step 312 determined whether the user's touch is localized or constitutes a sliding of a finger over the touch-sensitive display. In the Android OS, for example, this determination may be made using the view.MotionEvent class. Specifically, the X and Y axes of the present touch location may be extracted from constants of this class, and compared with the X and Y axes of the invocation attempt of the click event of step 302.

If it is determined that the user is indeed touching the same location, then method 300 may continue to steps 314 and 316. In step 314, which is optional, the portable multifunction device may be caused to briefly vibrate, by operating a vibrator of the portable multifunction device. The brief vibration may last 300 ms or less, and optionally 150 ms or less. During this period, the vibrator may vibrate at a frequency of between 4 Hz and 30 Hz. The brief vibration may signal to the user that the touch, lasting at least the duration of the timer, has been recognized by the portable multifunction device.

In a step 316, an action in the GUI of the OS may be performed, based on a location of the continuous touch by the user. Namely, if the continuous touch was at a location on the touch-sensitive where a certain button, link or another control was displayed, then the action associated with that button, link or other control may be performed.

Returning to decision step 312, if it is determined that the user is not touching the same location, namely—the user's touch was continuous but not stationary (i.e. the user swiped his or her finger over the touch-sensitive display), then the blocking of the invocation of the click event may become permanent, in step 310. Namely, the click event may be discarded and not processed by the OS. Then, the listening of step 302 may be returned to, since the present click is too short to be used as a trigger for action.

Figure 3:
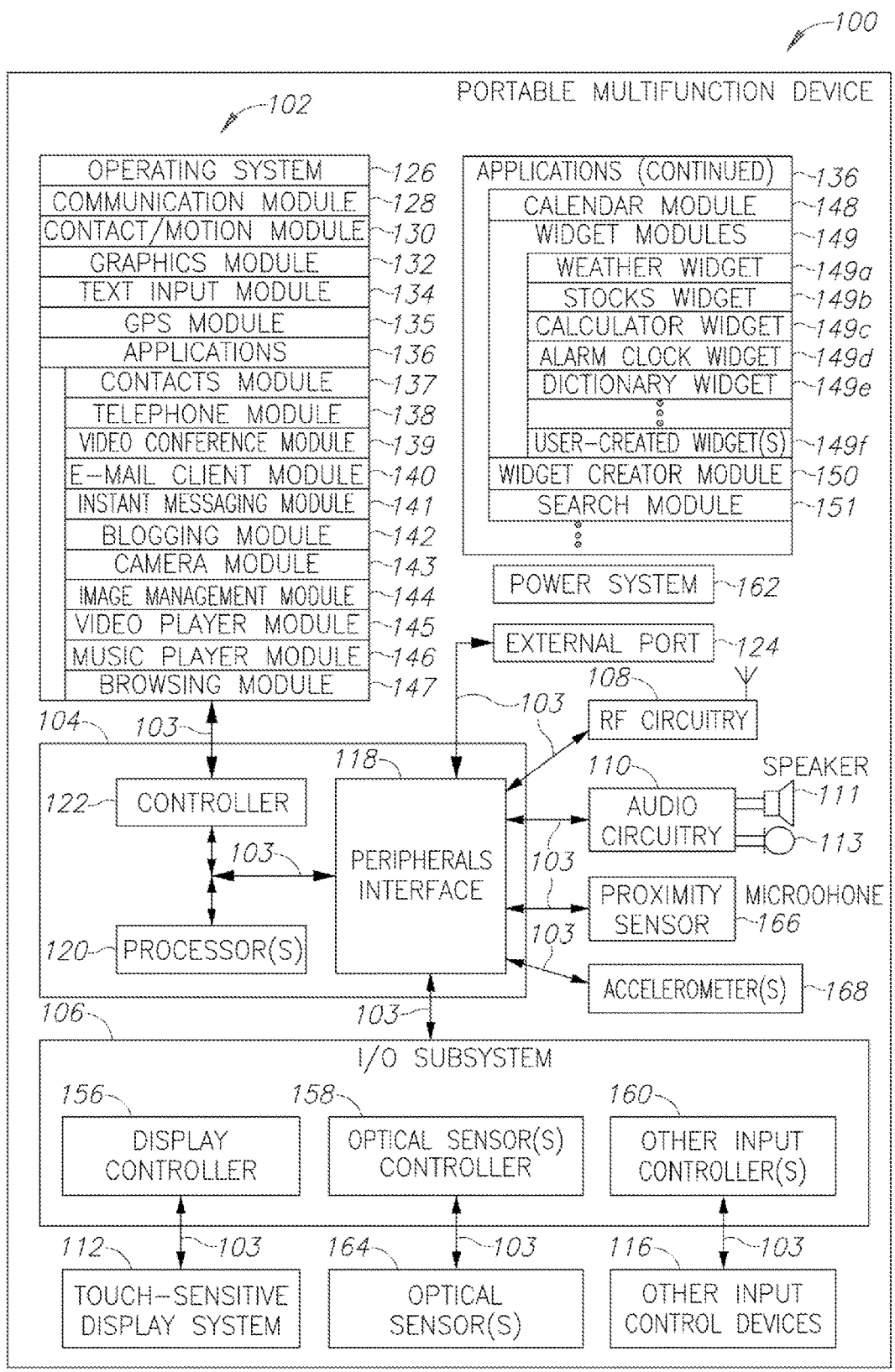
FIG. 3 shows a block diagram of a portable multifunction device.

Attention is now directed towards embodiments of the portable multifunction device. This device may be a smart phone, a tablet computer, a portable computer, and/or the like. FIG. 3 shows a block diagram illustrating a portable multifunction device 100 with a touch-sensitive display 112, in accordance with some embodiments. The touch-sensitive display 112 is sometimes called a "touch screen" for convenience, and may also be known as or called a touch-sensitive display system. Device 100 may include a memory 102 (which may include one or more computer readable storage mediums), a memory controller 122, one or more central processing units (CPUs) 120, a peripherals interface 118, RF circuitry 108, audio circuitry 110, a speaker 111, a microphone 113, an input/output (I/O) subsystem 106, other input or control devices 116, and an external port 124. Device 100 may include one or more optical sensors 164. These components may communicate over one or more communication buses or signal lines 103.

It should be appreciated that device 100 is only one example of a portable multifunction device 100, and that device 100 may have more or fewer components than shown, may combine two or more components, or a may have a different configuration or arrangement of the components. The various components shown in FIG. 9 may be implemented in hardware, software or a combination of both hardware and software, including one or more signal processing and/or application specific integrated circuits.

Memory 102 may include high-speed random access memory and may also include non-transient (also "non-volatile") memory, such as one or more magnetic disk storage devices, flash memory devices, or other non-volatile solid-state memory devices. Access to memory 102 by other components of device 100, such as the CPU 120 and the peripherals interface 118, may be controlled by the memory controller 122.

The peripherals interface 118 couples the input and output peripherals of the device to the CPU 120 and memory 102. The one or more processors 120 run or execute various software programs and/or sets of instructions stored in memory 102 to perform various functions for device 100 and to process data. The output peripherals of device 100 may include a vibrator (not shown), configured to cause the entire device to vibrate in a manner felt by a user holding the device. The vibrator may utilize any mechanism known in the art for causing mechanical vibrations, such as an electric motor with an unbalanced mass on its driveshaft.

In some embodiments, the peripherals interface 118, the CPU 120, and the memory controller 122 may be implemented on a single chip, such as a chip 104. In some other embodiments, they may be implemented on separate chips.

The RF (radio frequency) circuitry 108 receives and sends RF signals, also called electromagnetic signals. The RF circuitry 108 converts electrical signals to/from electromagnetic signals and communicates with communications networks and other communications devices via the electromagnetic signals. The RF circuitry 108 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. The RF circuitry 108 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of a plurality of communications standards, protocols and technologies, including but not limited to Global System for Mobile Communications (GSM), Enhanced Data GSM Environment (EDGE), high-speed downlink packet access (HSDPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for email (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), and/or Instant Messaging and Presence Service (IMPS)), and/or Short Message Service (SMS)), or any other suitable communication protocol, including communication protocols not yet developed as of the filing date of this document.

The audio circuitry 110, the speaker 111, and the microphone 113 provide an audio interface between a user and device 100. The audio circuitry 110 receives audio data from the peripherals interface 118, converts the audio data to an electrical signal, and transmits the electrical signal to the speaker 111. The speaker 111 converts the electrical signal to human-audible sound waves. The audio circuitry 110 also receives electrical signals converted by the microphone 113 from sound waves. The audio circuitry 110 converts the electrical signal to audio data and transmits the audio data to the peripherals interface 118 for processing. Audio data may be retrieved from and/or transmitted to memory 102 and/or the RF circuitry 108 by the peripherals interface 118. In some embodiments, the audio circuitry 110 also includes a headset jack. The headset jack provides an interface between the audio circuitry 110 and removable audio input/output peripherals, such as output-only headphones or a headset with both output (e.g., a headphone for one or both ears) and input (e.g., a microphone).

The I/O subsystem 106 couples input/output peripherals on device 100, such as the touch screen 112 and other input/control devices 116, to the peripherals interface 118. The I/O subsystem 106 may include a display controller 156 and one or more input controllers 160 for other input or control devices. The one or more input controllers 160 receive/send electrical signals from/to other input or control devices 116. The other input/control devices 116 may include physical buttons (e.g., push buttons, rocker buttons, etc.), dials, slider switches, joysticks, click wheels, and so forth. In some alternate embodiments, input controller(s) 160 may be coupled to any (or none) of the following: a keyboard, infrared port, USB port, and a pointer device such as a mouse. The one or more buttons may include an up/down button for volume control of the speaker 111 and/or the microphone 113. The one or more buttons may include a push button A quick press of the push button may disengage a lock of the touch screen 112 or begin a process that uses gestures on the touch screen to unlock the device, as described in U.S. patent application Ser. No. 11/322,549, "Unlocking a Device by Performing Gestures on an Unlock Image," filed Dec. 23, 2005, which is hereby incorporated by reference in its entirety. A longer press of the push button may turn power to device 100 on or off. The user may be able to customize a functionality of one or more of the buttons. The touch screen 112 is used to implement virtual or soft buttons and one or more soft keyboards.

The touch-sensitive touch screen 112 provides an input interface and an output interface between the device and a user. The display controller 156 receives and/or sends electrical signals from/to the touch screen 112. The touch screen 112 displays visual output to the user. The visual output may include graphics, text, icons, video, and any combination thereof (collectively termed "graphics"). In some embodiments, some or all of the visual output may correspond to user-interface objects, further details of which are described below.

A touch screen 112 has a touch-sensitive surface, sensor or set of sensors that accepts input from the user based on haptic and/or tactile contact. The touch screen 112 and the display controller 156 (along with any associated modules and/or sets of instructions in memory 102) detect contact (and any movement or breaking of the contact) on the touch screen 112 and converts the detected contact into interaction with user-interface objects (e.g., one or more soft keys, icons, web pages or images) that are displayed on the touch screen. In an exemplary embodiment, a point of contact between a touch screen 112 and the user corresponds to a finger of the user.

The touch screen 112 may use LCD (liquid crystal display) technology, or LPD (light emitting polymer display) technology, although other display technologies may be used in other embodiments. The touch screen 112 and the display controller 156 may detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with a touch screen 112.

A touch-sensitive display in some embodiments of the touch screen 112 may be analogous to the multi-touch sensitive tablets described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in their entirety. However, a touch screen 112 displays visual output from the portable device 100, whereas touch sensitive tablets do not provide visual output.

A touch-sensitive display in some embodiments of the touch screen 112 may be as described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these patents and applications are incorporated herein by reference in their entirety.

The touch screen 112 may have a resolution in excess of 100 dpi. In an exemplary embodiment, the touch screen has a resolution of approximately 160 dpi. The user may make contact with the touch screen 112 using any suitable object or appendage, such as a stylus, a finger, and so forth. In some embodiments, the user interface is designed to work primarily with finger-based contacts and gestures, which are much less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from the touch screen 112 or an extension of the touch-sensitive surface formed by the touch screen.

In some embodiments, device 100 may include a physical or virtual click wheel as an input control device 116. A user may navigate among and interact with one or more graphical objects (henceforth referred to as icons) displayed in the touch screen 112 by rotating the click wheel or by moving a point of contact with the click wheel (e.g., where the amount of movement of the point of contact is measured by its angular displacement with respect to a center point of the click wheel). The click wheel may also be used to select one or more of the displayed icons. For example, the user may press down on at least a portion of the click wheel or an associated button. User commands and navigation commands provided by the user via the click wheel may be processed by an input controller 160 as well as one or more of the modules and/or sets of instructions in memory 102. For a virtual click wheel, the click wheel and click wheel controller may be part of the touch screen 112 and the display controller 156, respectively. For a virtual click wheel, the click wheel may be either an opaque or semi-transparent object that appears and disappears on the touch screen display in response to user interaction with the device. In some embodiments, a virtual click wheel is displayed on the touch screen of a portable multifunction device and operated by user contact with the touch screen.

Device 100 also includes a power system 162 for powering the various components. The power system 162 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 may also include one or more optical sensors 164. FIG. 9 shows an optical sensor coupled to an optical sensor controller 158 in I/O subsystem 106. The optical sensor 164 may include charge-coupled device (CCD) or complementary metal-oxide semiconductor (CMOS) phototransistors. The optical sensor 164 receives light from the environment, projected through one or more lens, and converts the light to data representing an image. In conjunction with an imaging module 143 (also called a camera module), the optical sensor 164 may capture still images or video. In some embodiments, an optical sensor is located on the back of device 100, opposite the touch screen display 112 on the front of the device, so that the touch screen display may be used as a viewfinder for either still and/or video image acquisition. In some embodiments, an optical sensor is located on the front of the device so that the user's image may be obtained for videoconferencing while the user views the other video conference participants on the touch screen display. In some embodiments, the position of the optical sensor 164 can be changed by the user (e.g., by rotating the lens and the sensor in the device housing) so that a single optical sensor 164 may be used along with the touch screen display for both video conferencing and still and/or video image acquisition.

Device 100 may also include one or more proximity sensors 166. FIG. 9 shows a proximity sensor 166 coupled to the peripherals interface 118. Alternately, the proximity sensor 166 may be coupled to an input controller 160 in the I/O subsystem 106. The proximity sensor 166 may perform as described in U.S. patent application Ser. No. 11/241,839, "Proximity Detector In Handheld Device," filed Sep. 30, 2005; Ser. No. 11/240,788, "Proximity Detector In Handheld Device," filed Sep. 30, 2005; Ser. No. 11/620,702, "Using Ambient Light Sensor To Augment Proximity Sensor Output"; Ser. No. 11/586,862, "Automated Response To And Sensing Of User Activity In Portable Devices," filed Oct. 24, 2006; and Ser. No. 11/638,251, "Methods And Systems For Automatic Configuration Of Peripherals," which are hereby incorporated by reference in their entirety. In some embodiments, the proximity sensor turns off and disables the touch screen 112 when the multifunction device is placed near the user's ear (e.g., when the user is making a phone call). In some embodiments, the proximity sensor keeps the screen off when the device is in the user's pocket, purse, or other dark area to prevent unnecessary battery drainage when the device is a locked state.

Device 100 may also include one or more accelerometers 168. FIG. 9 shows an accelerometer 168 coupled to the peripherals interface 118. Alternately, the accelerometer 168 may be coupled to an input controller 160 in the I/O subsystem 106. The accelerometer 168 may perform as described in U.S. Patent Publication No. 2005/0190059, "Acceleration-based Theft Detection System for Portable Electronic Devices," and U.S. Patent Publication No. 2006/0017692, "Methods And Apparatuses For Operating A Portable Device Based On An Accelerometer," both of which are which are incorporated by reference in their entirety. In some embodiments, information is displayed on the touch screen display in a portrait view or a landscape view based on an analysis of data received from the one or more accelerometers.

In some embodiments, the software components stored in memory 102 may include an operating system 126, a communication module (or set of instructions) 128, a contact/motion module (or set of instructions) 130, a graphics module (or set of instructions) 132, a text input module (or set of instructions) 134, a Global Positioning System (GPS) module (or set of instructions) 135, and applications (or set of instructions) 136.

The operating system 126 (e.g., Android, RTXC, Linux, Unix, OS X, Windows, or an embedded operating system such as VxWorks) includes various software components and/or drivers for controlling and managing general system tasks (e.g., memory management, storage device control, power management, etc.) and facilitates communication between various hardware and software components.

The communication module 128 facilitates communication with other devices over one or more external ports 124 and also includes various software components for handling data received by the RF circuitry 108 and/or the external port 124. The external port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on iPod (trademark of Apple Computer, Inc.) devices.

The contact/motion module 130 may detect contact with the touch screen 112 (in conjunction with the display controller 156) and other touch sensitive devices (e.g., a touchpad or physical click wheel). The contact/motion module 130 includes various software components for performing various operations related to detection of contact, such as determining if contact has occurred, determining if there is movement of the contact and tracking the movement across the touch screen 112, and determining if the contact has been broken (i.e., if the contact has ceased). Determining movement of the point of contact may include determining speed (magnitude), velocity (magnitude and direction), and/or an acceleration (a change in magnitude and/or direction) of the point of contact. These operations may be applied to single contacts (e.g., one finger contacts) or to multiple simultaneous contacts (e.g., "multitouch"/multiple finger contacts). In some embodiments, the contact/motion module 130 and the display controller 156 also detects contact on a touchpad. In some embodiments, the contact/motion module 130 and the controller 160 detects contact on a click wheel.

The graphics module 132 includes various known software components for rendering and displaying graphics on the touch screen 112, including components for changing the intensity of graphics that are displayed. As used herein, the term "graphics" includes any object that can be displayed to a user, including without limitation text, web pages, icons (such as user-interface objects including soft keys), digital images, videos, animations and the like. An animation in this context is a display of a sequence of images that gives the appearance of movement, and informs the user of an action that has been performed (such as moving an email message to a folder). In this context, a respective animation that confirms an action by the user of the device typically takes a predefined, finite amount of time, such as an amount of time between 0.2 and 1.0 seconds, or between 0.5 and 2.0 seconds, depending on the context.

The text input module 134, which may be a component of graphics module 132, provides soft keyboards for entering text in various applications (e.g., contacts 137, e-mail 140, IM 141, blogging 142, browser 147, and any other application that needs text input).

The GPS module 135 determines the location of the device and provides this information for use in various applications (e.g., to telephone 138 for use in location-based dialing, to camera 143 and/or blogger 142 as picture/video metadata, and to applications that provide location-based services such as weather widgets, local yellow page widgets, and map/navigation widgets).

The applications 136 may include the following modules (or sets of instructions), or a subset or superset thereof:

a contacts module 137 (sometimes called an address book or contact list);

a telephone module 138;

a video conferencing module 139;

an e-mail client module 140;

an instant messaging (IM) module 141;

a blogging module 142;

a camera module 143 for still and/or video images;

an image management module 144;

a video player module 145;

a music player module 146;

a browser module 147;

a calendar module 148;

widget modules 149, which may include weather widget 149a, stocks widget 149b, calculator widget 149c, alarm clock widget 149d, dictionary widget 149e, and other widgets obtained by the user, as well as user-created widgets 149f;

widget creator module 150 for making user-created widgets 149f;

search module 151;

video and music player module 152, which merges video player module 145 and music player module 146;

notes module 153; and/or map module 154.

Examples of other applications 136 that may be stored in memory 102 include other word processing applications, JAVA-enabled applications, encryption, digital rights management, voice recognition, and voice replication.

In conjunction with touch screen 112, display controller 156, contact module 130, graphics module 132, and text input module 134, the contacts module 137 may be used to manage an address book or contact list, including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference 139, e-mail 140, or IM 141; and so forth. Embodiments of user interfaces and associated processes using contacts module 137 are described further below.

In conjunction with RF circuitry 108, audio circuitry 110, speaker 111, microphone 113, touch screen 112, display controller 156, contact module 130, graphics module 132, and text input module 134, the telephone module 138 may be used to enter a sequence of characters corresponding to a telephone number, access one or more telephone numbers in the address book 137, modify a telephone number that has been entered, dial a respective telephone number, conduct a conversation and disconnect or hang up when the conversation is completed. As noted above, the wireless communication may use any of a plurality of communications standards, protocols and technologies. Embodiments of user interfaces and associated processes using telephone module 138 are described further below.

In conjunction with RF circuitry 108, audio circuitry 110, speaker 111, microphone 113, touch screen 112, display controller 156, optical sensor 164, optical sensor controller 158, contact module 130, graphics module 132, text input module 134, contact list 137, and telephone module 138, the videoconferencing module 139 may be used to initiate, conduct, and terminate a video conference between a user and one or more other participants.

In conjunction with RF circuitry 108, touch screen 112, display controller 156, contact module 130, graphics module 132, and text input module 134, the e-mail client module 140 may be used to create, send, receive, and manage e-mail. In conjunction with image management module 144, the e-mail module 140 makes it very easy to create and send e-mails with still or video images taken with camera module 143. Embodiments of user interfaces and associated processes using e-mail module 140 are described further below.

In conjunction with RF circuitry 108, touch screen 112, display controller 156, contact module 130, graphics module 132, and text input module 134, the instant messaging module 141 may be used to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages and to view received instant messages. In some embodiments, transmitted and/or received instant messages may include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS). Embodiments of user interfaces and associated processes using instant messaging module 141 are described further below.

In conjunction with RF circuitry 108, touch screen 112, display controller 156, contact module 130, graphics module 132, text input module 134, image management module 144, and browsing module 147, the blogging module 142 may be used to send text, still images, video, and/or other graphics to a blog (e.g., the user's blog).

In conjunction with touch screen 112, display controller 156, optical sensor(s) 164, optical sensor controller 158, contact module 130, graphics module 132, and image management module 144, the camera module 143 may be used to capture still images or video (including a video stream) and store them into memory 102, modify characteristics of a still image or video, or delete a still image or video from memory 102. Embodiments of user interfaces and associated processes using camera module 143 are described further below.

In conjunction with touch screen 112, display controller 156, contact module 130, graphics module 132, text input module 134, and camera module 143, the image management module 144 may be used to arrange, modify or otherwise manipulate, label, delete, present (e.g., in a digital slide show or album), and store still and/or video images. Embodiments of user interfaces and associated processes using image management module 144 are described further below.

In conjunction with touch screen 112, display controller 156, contact module 130, graphics module 132, audio circuitry 110, and speaker 111, the video player module 145 may be used to display, present or otherwise play back videos (e.g., on the touch screen or on an external, connected display via external port 124). Embodiments of user interfaces and associated processes using video player module 145 are described further below.

In conjunction with touch screen 112, display system controller 156, contact module 130, graphics module 132, audio circuitry 110, speaker 111, RF circuitry 108, and browser module 147, the music player module 146 allows the user to download and play back recorded music and other sound files stored in one or more file formats, such as MP3 or AAC files. In some embodiments, device 100 may include the functionality of an MP3 player, such as an iPod (trademark of Apple Computer, Inc.). Embodiments of user interfaces and associated processes using music player module 146 are described further below.

In conjunction with RF circuitry 108, touch screen 112, display system controller 156, contact module 130, graphics module 132, and text input module 134, the browser module 147 may be used to browse the Internet, including searching, linking to, receiving, and displaying web pages or portions thereof, as well as attachments and other files linked to web pages. Embodiments of user interfaces and associated processes using browser module 147 are described further below.

In conjunction with RF circuitry 108, touch screen 112, display system controller 156, contact module 130, graphics module 132, text input module 134, e-mail module 140, and browser module 147, the calendar module 148 may be used to create, display, modify, and store calendars and data associated with calendars (e.g., calendar entries, to do lists, etc.). Embodiments of user interfaces and associated processes using calendar module 148 are described further below.

In conjunction with RF circuitry 108, touch screen 112, display system controller 156, contact module 130, graphics module 132, text input module 134, and browser module 147, the widget modules 149 are mini-applications that may be downloaded and used by a user (e.g., weather widget 149*a*, stocks widget 149*b*, calculator widget 149*c*, alarm clock widget 149*d*, and dictionary widget 149*e*) or created by the user (e.g., user-created widget 149*f*). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display system controller 156, contact module 130, graphics module 132, text input module 134, and browser module 147, the widget creator module 150 may be used by a user to create widgets (e.g., turning a user-specified portion of a web page into a widget).

In conjunction with touch screen 112, display system controller 156, contact module 130, graphics module 132, and text input module 134, the search module 151 may be used to search for text, music, sound, image, video, and/or other files in memory 102 that match one or more search criteria (e.g., one or more user-specified search terms).

In conjunction with touch screen 112, display controller 156, contact module 130, graphics module 132, and text input module 134, the notes module 153 may be used to create and manage notes, to do lists, and the like.

In conjunction with RF circuitry 108, touch screen 112, display system controller 156, contact module 130, graphics module 132, text input module 134, GPS module 135, and browser module 147, the map module 154 may be used to receive, display, modify, and store maps and data associated with maps (e.g., driving directions; data on stores and other points of interest at or near a particular location; and other location-based data).

Each of the above identified modules and applications correspond to a set of instructions for performing one or more functions described above. These modules (i.e., sets of instructions) need not be implemented as separate software programs, procedures or modules, and thus various subsets of these modules may be combined or otherwise re-arranged in various embodiments. For example, video player module 145 may be combined with music player module 146 into a single module (e.g., video and music player module 152). In some embodiments, memory 102 may store a subset of the modules and data structures identified above. Furthermore, memory 102 may store additional modules and data structures not described above.

In some embodiments, device 100 is a device where operation of a predefined set of functions on the device is performed exclusively through a touch screen 112 and/or a touchpad. By using a touch screen and/or a touchpad as the primary input/control device for operation of device 100, the number of physical input/control devices (such as push buttons, dials, and the like) on device 100 may be reduced.

The predefined set of functions that may be performed exclusively through a touch screen and/or a touchpad include navigation between user interfaces. In some embodiments, the touchpad, when touched by the user, navigates device 100 to a main, home, or root menu from any user interface that may be displayed on device 100. In such embodiments, the touchpad may be referred to as a "menu button." In some other embodiments, the menu button may be a physical push button or other physical input/control device instead of a touchpad.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a hardware processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the description and claims of the application, each of the words "comprise" "include" and "have", and forms thereof, are not necessarily limited to members in a list with which the words may be associated. In addition, where there are inconsistencies between this application and any document incorporated by reference, it is hereby intended that the present application controls.

What is claimed is:

1. A method for operating a portable multifunction device, the method comprising:
   automatically activating an application launcher immediately upon a loading of an operating system of the portable multifunction device, thereby exclusively controlling application launching in the portable multifunction device, wherein the application launcher:
      is a computer program that enables a user of the portable multifunction device to locate and start other computer programs on the portable multifunction device, and
      provides a GUI (Graphical User Interface) which partially or fully replaces a default GUI of the operating system of the portable multifunction device;
   using the application launcher, and immediately after the application launcher is activated, automatically running an accessible GUI application, wherein the accessible GUI:
      is characterized by texts and graphics that are larger and clearer compared to texts and graphics of the default GUI of the portable multifunction device, thereby making the accessible GUI suitable for use by one or more of: elderly people, young children, and people with impaired vision;
   wherein the immediate running of the accessible GUI application after the activation of the application launcher, and the immediate activation of the application launcher upon the loading of the operating system, prevent a user of the portable multifunction device from using functionalities of the default GUI;
   in the accessible GUI application, listening for an invocation of a long click event by the operating system, wherein the long click event is caused by a user continuously touching a touch-sensitive display of the portable multifunction device for 250 milliseconds (ms) or more; and
   responsive to the long click event:
      (a) causing the portable multifunction device to vibrate for 300 ms or less, thereby signaling to the user that the continuous touch has been recognized by the portable multifunction device, and
      (b) performing an action in the accessible GUI application, based on a location of the continuous touch by the user.

2. The method according to claim 1, wherein the operating system is Android, and the long click event is provided by View.OnLongClickListener.

3. The method according to claim 1, wherein the long click event is caused by the user continuously touching the touch-sensitive display of the portable multifunction device for 500 ms or more.

4. The method according to claim 1, wherein the causing of the portable multifunction device to vibrate is for 150 ms or less.

5. An application launcher for a portable multifunction device, the application launcher comprised in a non-transitory computer-readable storage medium having program code embodied therewith, the program code executable by at least one hardware processor of the portable multifunction device for:
   automatically activating the application launcher immediately upon a loading of an operating system of the portable multifunction device, thereby exclusively controlling application launching in the portable multifunction device, wherein the application launcher:
      is a computer program that enables a user of the portable multifunction device to locate and start other computer programs on the portable multifunction device, and
      provides a GUI (Graphical User Interface) which partially or fully replaces a default GUI of the operating system of the portable multifunction device;
   using the application launcher, and immediately after the application launcher is activated, automatically running an accessible GUI application, wherein the accessible GUI:
      is characterized by texts and graphics that are larger and clearer compared to texts and graphics of the default GUI of the portable multifunction device, thereby making the accessible GUI suitable for use by one or more of: elderly people, young children, and people with impaired vision;
   wherein the immediate running of the accessible GUI application after the activation of the application launcher, and the immediate activation of the application launcher upon the loading of the operating system, prevent a user of the portable multifunction device from using functionalities of the default GUI;
   in the accessible GUI application, listening for an invocation of a long click event by the operating system, wherein the long click event is caused by a user continuously touching a touch-sensitive display of the portable multifunction device for 250 milliseconds (ms) or more; and
   responsive to the long click event:
      (a) causing the portable multifunction device to vibrate for 300 ms or less, thereby signaling to the user that the continuous touch has been recognized by the portable multifunction device, and
      (b) performing an action in the accessible GUI application, based on a location of the continuous touch by the user.

6. The application launcher according to claim 5, wherein the operating system is Android, and the long click event is provided by View.OnLongClickListener.

7. The application launcher according to claim 5, wherein the long click event is caused by the user continuously touching the touch-sensitive display of the portable multifunction device for 500 ms or more.

8. The application launcher according to claim 5, wherein the causing of the portable multifunction device to vibrate is for 150 ms or less.

9. A portable multifunction device comprising:
- a touch-sensitive display;
- a vibrator;
- at least one CPU (Central Processing Unit); and
- a non-transitory memory device having program code of an application launcher embodied therewith, the program code executable by said at least one CPU for:
- automatically activating the application launcher immediately upon a loading of an operating system of the portable multifunction device, thereby exclusively controlling application launching in the portable multifunction device, wherein the application launcher:
  - is a computer program that enables a user of the portable multifunction device to locate and start other computer programs on the portable multifunction device, and
  - provides a GUI (Graphical User Interface) which partially or fully replaces a default GUI of the operating system of the portable multifunction device,
- using the application launcher, and immediately after the application launcher is activated, automatically running an accessible GUI application, wherein the accessible GUI:
  - is characterized by texts and graphics that are larger and clearer compared to texts and graphics of the default GUI of the portable multifunction device, thereby making the accessible GUI suitable for use by one or more of: elderly people, young children, and people with impaired vision,
- wherein the immediate running of the accessible GUI application after the activation of the application launcher, and the immediate activation of the application launcher upon the loading of the operating system, prevent a user of the portable multifunction device from using functionalities of the default GUI,
- in the accessible GUI application, listening for an invocation of a long click event by the operating system, wherein the long click event is caused by a user continuously touching said touch-sensitive display for 250 milliseconds (ms) or more, and
- responsive to the long click event:
  - (a) causing said vibrator to vibrate for 300 ms or less, thereby signaling to the user that the continuous touch has been recognized by the portable multifunction device, and
  - (b) performing an action in the accessible GUI application, based on a location of the continuous touch by the user.

10. The portable multifunction device according to claim 9, wherein the operating system is Android, and the long click event is provided by View.OnLongClickListener.

11. The portable multifunction device according to claim 9, wherein the long click event is caused by the user continuously touching the touch-sensitive display of the portable multifunction device for 500 ms or more.

12. The portable multifunction device according to claim 9, wherein the causing of said vibrator to vibrate is for 150 ms or less.

* * * * *